March 31, 1970 HITOSHI MATSUDA 3,503,615

RECORD PLAYER

Filed Jan. 11, 1967 4 Sheets-Sheet 1

INVENTOR.
Hitoshi Matsuda

BY Hill, Sherman, Meroni, Gross & Simpson ATTORNEYS

March 31, 1970 HITOSHI MATSUDA 3,503,615

RECORD PLAYER

Filed Jan. 11, 1967 4 Sheets-Sheet 2

INVENTOR.
Hitoshi Matsuda

BY Hill, Sherman, Meroni, Gross & Simpson ATTORNEYS

March 31, 1970 HITOSHI MATSUDA 3,503,615

RECORD PLAYER

Filed Jan. 11, 1967 4 Sheets-Sheet 3

INVENTOR.
Hitoshi Matsuda

BY Hill, Sherman, Meroni, Gross & Simpson ATTORNEYS

March 31, 1970 HITOSHI MATSUDA 3,503,615

RECORD PLAYER

Filed Jan. 11, 1967 4 Sheets-Sheet 4

INVENTOR.
Hitoshi Matsuda

BY Hill, Sherman, Meroni, Gross & Simpson ATTORNEYS

United States Patent Office 3,503,615

Patented Mar. 31, 1970

3,503,615

RECORD PLAYER

Hitoshi Matsuda, Tokyo, Japan, assignor to Nippon Columbia Kabushikikaisha (Nippon Columbia Co., Ltd.), Tokyo, Japan, a corporation of Japan Filed Jan. 11, 1967, Ser. No. 608,583
Claims priority, application Japan, Jan. 19, 1966, 41/2,946
Int. Cl. G11b *17/08*
U.S. Cl. 274—10 11 Claims

ABSTRACT OF THE DISCLOSURE

A record player including means for detecting and memorizing the angular position of a pickup arm which means consist of a movable part affixed to the rotary shaft of the pickup arm and a stationary part disposed opposite to the movable part so that the parts cooperate with each other to produce an electric signal to memorize an angular position of the pickup arm at which the pickup arm is to begin playing, the foregoing parts also cooperating to help bring the pickup arm back to the memorized position to start playing.

BACKGROUND OF THE INVENTION

Field of the invention

This invention generally relates to a record player, and more particularly to a record player having incorporated therein means for selectively playing desired one of a plurality of tunes recorded on one record.

Description of the prior art

Record playing for broadcasting or the like often requires selection of one of a plurality of different kinds of record zones recorded on one side of a record and almost all the selecting operations are made immediately prior to broadcasting. In such a case, it is the practice that immediately before playing the stylus of a pickup is placed in a non-record zone groove before the record zone to be played and then playing is started at a predetermined time.

Further, in practical broadcasting a plurality of records are handled in the above manner, but accurate selection and playing of desired one of a plurality of tunes in a short time require a considerable amount of skill and are considerably difficult. In conventional types of record players such operations are all carried out manually, and consequently automatic operations for the purpose do not require skill and enable playing to accurately start from a predetermined position.

Conventional automatic playing employs such a method that upon completion of playing a record it is replaced with a next record or a method such that a plurality of records put one on another are sequentially dropped on the turntable. In such methods positioning of the pickup for starting of playing is previously determined in accordance with the diameter of the record and a pickup is brought to a predetermined position from where its play starts.

With the conventional method, it is impossible to selectively play only desired one of a plurality of different record zones recorded on one side of one record.

SUMMARY OF THE INVENTION

Accordingly, one object of this invention is to provide a record player which is capable of automatic and selective playing of desired one of a plurality of record zones recorded on a record.

Another object of this invention is to provide a record player which is capable of selective playing of desired ones of a plurality of different record zones recorded on a plurality of records.

Another object of this invention is to provide a record player in which rotating position detecting means are provided on the rotatry shaft of the pickup arm.

Another object of this invention is to provide a record player which is provided with rotating position detecting means of a differential transformer type consisting of a magnetic plate affixed to the rotary shaft of the pickup arm and a plurality of coils inductively coupled with the magnetic plate.

Another object of this invention is to provide a record player which is equipped with memory means provided in relation to the rotary shaft of the pickup arm.

Still another object of this invention is to provide a record player which is equipped with pickup arm horizontal driving means provided in relation to the rotary shaft of the pickup arm.

Briefly, the record player of the present invention has means provided with respect to the rotary shaft of the pickup arm of the record player for producing an electrical signal corresponding to a predetermined angular position of the pickup arm thereby to select playing of desired one of a plurality of record zones recorded on a record automatically.

Other objects, features and advantages of this invention will become apparent from the following description taken in conjunction with the accompanying drawings, in which;

The present invention will hereinafter be described in detail with reference to the drawings.

DESCRIPTION OF THE PRESENT INVENTION

Figure 1:
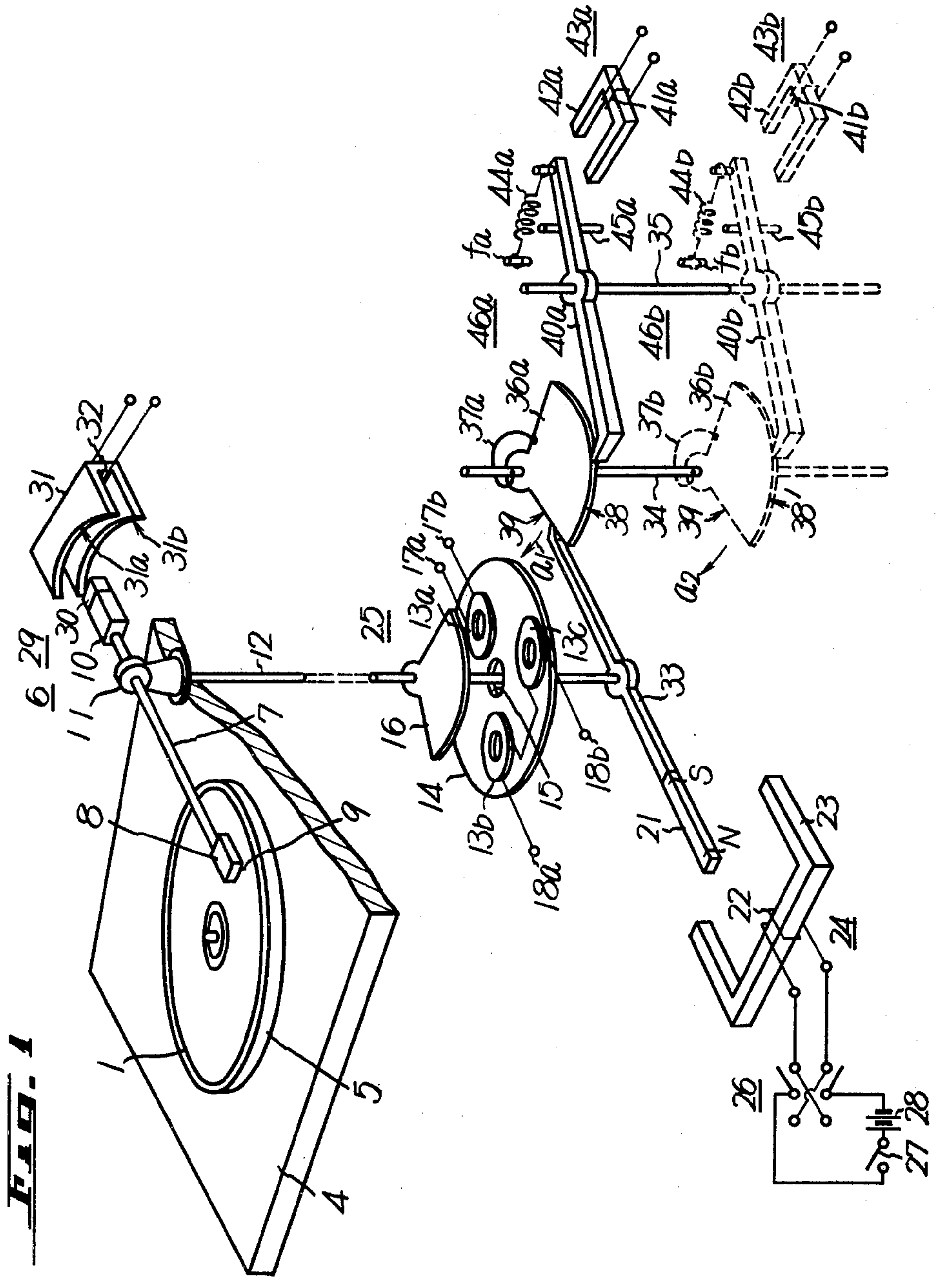
FIGURE 1 is a perspective view schematically illustrating one example of a record player according to this invention.
Figure 2:
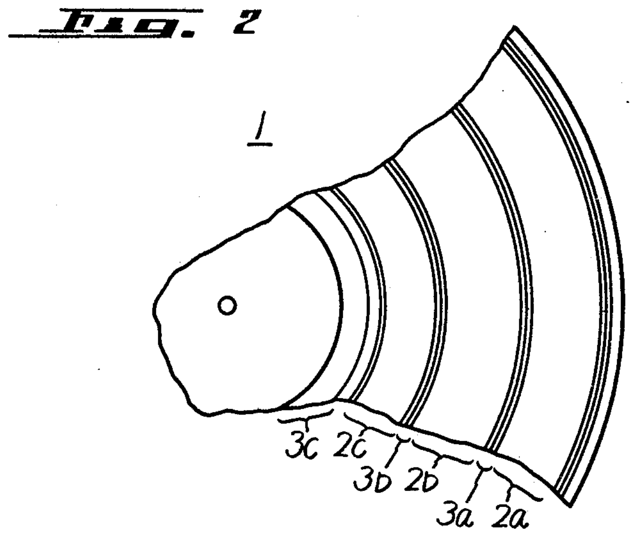
FIGURE 2 is a partial plan view of one example of a record usable in this invention.

In FIGURE 1 reference numeral 1 indicates a record, on one side of which are provided a plurality of record zones, for example, three zones 2*a*, 2*b* and 2*c*, as exemplified in FIGURE 2, tunes being individually recorded in the record zones. For convenience of illustration, these record zones 2*a*, 2*b* and 2*c* are referred to as first, second and third record zones, and portions between the first and second record zones and subsequent to the third record zone are referred to as non-record zones 3*a*, 3*b* and 3*c*. Reference numeral 4 identifies a motor board, 5 a turnable, 6 generally a pickup, 7 a pickup arm, 8 a cartridge mounted on one end of the pickup arm 7, 9 a stylus attached to the cartridge 8, 10 a weight balancer mounted on the other end of the pickup arm 7 and 11 a bearing member or a pivot of the pickup arm 7. The bearing member 11 is designed so that the pickup arm 7 may freely move in a direction along the surface of the record 1 and in a direction perpendicular to the surface of the record 1. This is not related directly to the gist of the present invention, and hence no detailed description will be given in this specification.

Figure 3:
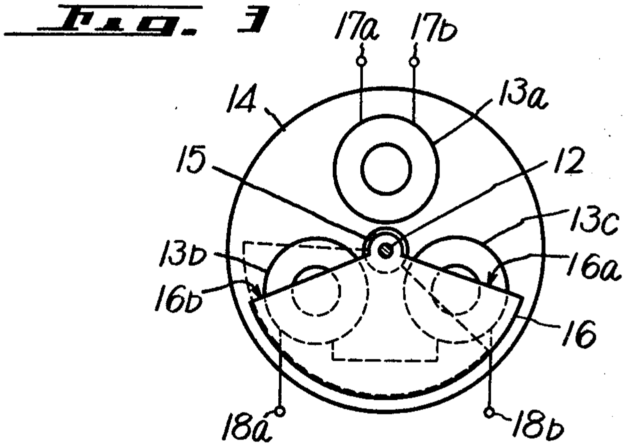
FIGURE 3 is a plan view showing one example of means for detecting the rotational angular position of a pickup arm.
Figure 4:
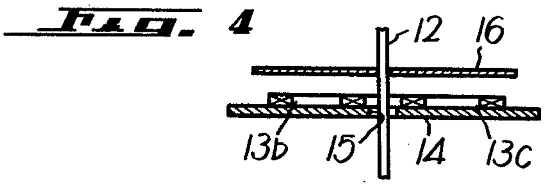
FIGURE 4 is a cross-sectional view of the detecting means depicted in FIGURE 3.

Extending downward through the motor board 4 from the pickup arm 7 is a rotary shaft 12, around which three coils 13*a*, 13*b* and 13*c* are disposed. These coils 13*a*, 13*b* and 13*c* are wound flat and substantially circular in shape as illustrated in FIGURES 3 and 4, and they are disposed on an insulating plate 14 at equiangular intervals about an aperture 15. The insulating plate 14 is secured to a stationary part by suitable fixing means, though not illustrated. The rotary shaft 12 passes through the aperture 15 without making contact with its margin. Meanwhile, a fan-shaped rotary plate 16 made of a magnetic material or the like is affixed to the rotary shaft 12 in opposing relation to the coils 13*a*, 13*b* and 13*c* but a little spaced therefrom. Accordingly, the mutual inductance of the coils 13*a*, 13*b* and 13*c* is varied with the rotational position of the rotary plate 16 affixed to the rotary shaft 12. The above arrangement forms a kind of differential transformer. One of the coils, for example, 13*a* is used as a primary coil, to the terminals 17*a* and 17*b* of which is applied an AC current of, for example, about 10 kc./s. The coils 13*b* and 13*c* are used as secondary coils cooperating with the primary coils 13*a* and they are connected differentially, from the output terminals 18*a* and 18*b* of which outputs are taken out. In the example depicted in FIGURE 3, two edges 16*a* and 16*b* adjoining the circular portion of the magnetic plate 16 assume the same positions with respect to the coils 13*b* and 13*c*, so that their outputs are in equilibrium. Therefore, the sum of the outputs is zero and no signals are detected from the terminals 18*a* and 18*b*. However, when the rotary plate 16 rotates as indicated by broken lines in FIGURE 3 due to rotation of the pickup arm 7 and consequently the rotary shaft 12, the magnetic coupling of the secondary coils 13*b* and 13*c* with respect to the primary coil 13*a* varies correspondingly. That is, the magnetic coupling of the secondary coil 13*b* to the rotary plate 16 becomes greater than that of the secondary coil 13*a*, so that the output of the former becomes greater than that of the latter. As a result of this, output voltage V is obtained from the terminals 18*a* and 18*b*. The relationship between the rotational angle $\theta$ of the rotary shaft 12 and the output voltage V is indicated by a full line 19 in FIGURE 7A, the ordinate representing the output voltage V and the abscissa the rotational angle $\theta$. This invention utilizes only such a range from $\theta_1$ to $\theta_2$ in which the output voltage V between the output terminals 18*a* and 18*b* linearly varies in direct proportion to the rotational angle $\theta$ of the rotary plate 16 and consequently the rotary shaft 12. It is sufficient in practice that the rotational angle $\theta$ is 60° at maximum. The foregoing has been made in connection with the case where the so-called differential transformer is constituted by one primary coil 13*a* and two secondary coils 13*b* and 13*c* connected in series. However, only two coils, namely one primary coil, for example 13*a* and one secondary coil, for instance, 13*b* will serve the purpose. In such a case, the relationship between the output voltage V and the rotational angle $\theta$ is as indicated by the broken line in FIGURE 7A. As is apparent from the figure, the broken line 20 is gentler in inclination than the full line 19. In other words, with the empolyment of the two secondary coils 13*b* and 13*c* to the one primary coil 13*a* as in FIGURE 3 the output varies with the same rotation angle more greatly than in the case of using only two coils. Namely, control becomes easier correspondingly. Further, in the case of the broken line 20 the range of the linear variation of the output becomes narrower.

Figure 7:
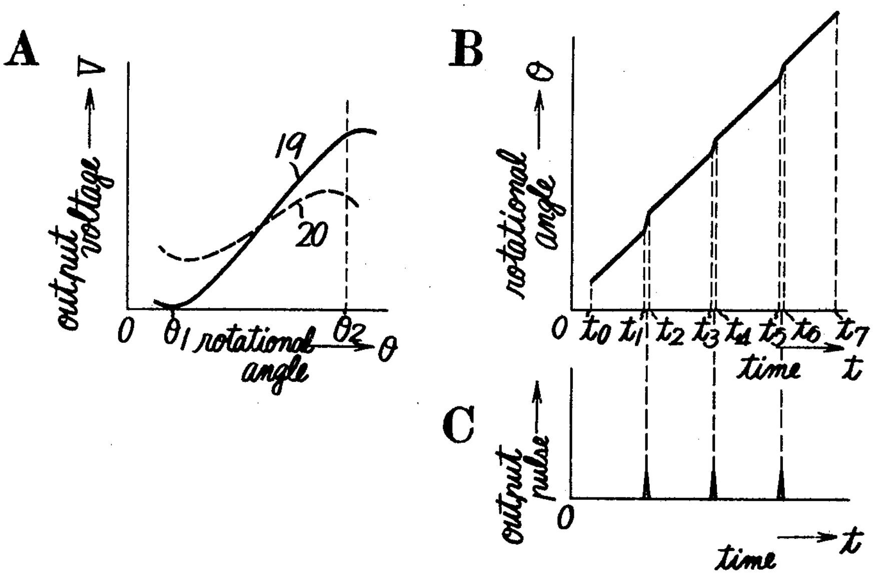
FIGURES 7A, 7B and 7C are graphs for describing the detecting means depicted in FIGURES 3 and 6.

The above-described device serves to detect the time when the stylus 9 of the pickup arm 6 has reached the non-record zone 3*a*, 3*b* or 3*c* from the record zone 2*a*, 2*b* or 2*c*. This device will hereinafter be referred to as means 25 for detecting the rotational position of the pickup arm 6. The reasons for requiring such means will be seen from the following description. Now, a description will be given in connection with the operation of the detecting means 35. As illustrated in FIGURE 7A, the output voltage V from the secondary coils gradually varies with rotation of the pickup arm 7 and consequently the rotary shaft 12. However, the pitch of the grooves of the non-record zones 3*a*, 3*b* and 3*c* is greater than that of the grooves of the record zones 2*a*, 2*b* and 2*c*, though the pitch difference is dependent upon records employed. Therefore, the rotational speed of the pickup arm 7 and consequently the rotary shaft 12 at times from $t_1$ to $t_2$, $t_3$ to $t_4$ and $t_5$ to $t_6$ during which the stylus 9 slides on the non-record zones 3*a*, 3*b* and 3*c* is greater than that at times from $t_0$ to $t_1$, $t_2$ to $t_3$ and $t_4$ to $t_5$ while the stylus 9 sliding on the record zones 2*a*, 2*b* and 2*c*, as clearly seen from FIGURE 7B. This implies that the rotational speed of the rotary plate 16 increases with an increase in that of the rotary shaft 12. As a result of this, the output voltage V emanating from the output terminals 18*a* and 18*b* greatly increases at the times from $t_1$ to $t_2$, $t_3$ to $t_4$ and $t_5$ to $t_6$ as illustrated in FIGURE 7B. The signals from the output terminals 18*a* and 18*b* are applied to, for example, a differentiation circuit to obtain such pulses as depicted in FIGURE 7C, by which the rotating position of the pickup arm 7 can be detected.

Figure 5:
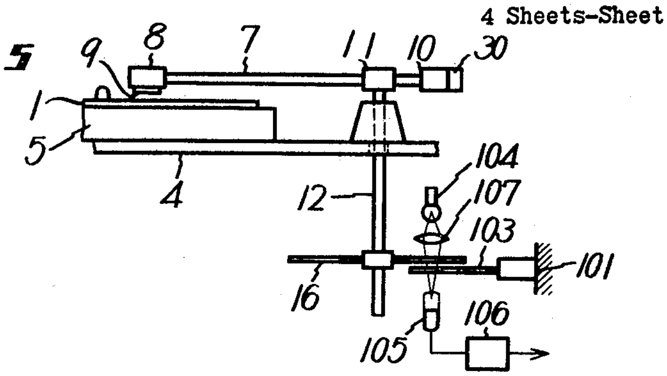
FIGURE 5 is a side view of a record player equipped with another example of the detecting means.
Figure 6:
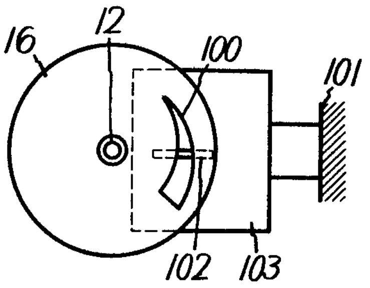
FIGURE 6 is a plan view of the principal part of the example depicted in FIGURE 5.

A modified form of the rotating position detecting means 25 is illustrated in FIGURES 5 and 6. For the sake of brevity, components similar to those in FIGURES 1, 3 and 4 are identified by similar reference numerals and no detailed description will be given. In the example illustrated in the figures, a disc-like rotary plate 16 is made of a material inhibiting passage of light therethrough and the rotary plate 16 has formed therein an aperture 100 whose width continuously varies, as illustrated in FIGURE 6. Under the rotary plate 16 there is disposed a plate 103 which is supported at one end by a stationary part 101 and has formed therein a slit 102, the plate 103 being also made of a material inhibiting passage of light therethrough. In this case the aperture 100 and the slit 102 are configured such that the area of their overlap varies continuously with the rotation of the rotary plate 16. The rotary plate 16 need not always be circular and it may be a fan-shaped one having an angle corresponding to the maximum rotation angle of the pickup arm and having formed therein an aperture. Further, a light source 104 is disposed above the aperture 100 of the rotary plate 16 and a photoelectric converter 105 such as a phototransistor, photo-cell, CdS-plate or the like is located under the slit 102 of the plate 103. The output side of the photoelectric converter 105 is connected to a control circuit 106. In addition, a focusing lens 107 may be disposed between the light source 104 and the photoelectric converter 105, if necessary. The operation of the rotating position detecting means employed in this example is substantially the same as that of the detecting means depicted in FIGURES 1, 3 and 4, and this detecting means yield such characteristic curves as shown in FIGURES 7A and 7B. That is, according as the stylus 9 of the pickup arm 7 runs on the record zone or non-record zone, the rotating speed of the rotary shaft 12 varies and that of the rotary plate 16 varies correspondingly. Accordingly, at the times from $t_1$ to $t_2$, $t_3$ to $t_4$ and $t_5$ to $t_6$ the variations in the quantity of light reaching the photoelectric converter 105 from the light source 104 through the aperture 100 and the slit 102 exceed those in the quantity of light at the times from $t_0$ to $t_1$, $t_2$ to $t_3$ and $t_4$ to $t_5$. The quantity of light impinging the photoelectric converter 105 is thereby converted into an electrical output, and the output varies with the quantity of light so that such a curve as shown in FIGURE 7B can be obtained. Application of the electrical output thus obtained to a differentiation included in the control circuit provides a pulse-like output such as depicted in FIGURES 7C. Further, the rotating position detecting means 25 may be capacitive coupling means other than the aforementioned differential coupling transformer coupling means, inductive coupling means and optical coupling means. In such a case, the rotary plate 16 is a movable electrode and the plate 103 is a fixed electrode, and by suitable selection of the electrodes a desired output voltage can be obtained. With the pulse output (FIGURE 7C) obtained as above described, a motor is controlled to stop. The stopping position of the motor corresponds to the starting point of a tune selected, and hence the motor is then automatically rotated, by suitable means described later, in a reverse direction and stopped in such a position as to bring the stylus 9 to the groove ahead of the tune selected. Thus, the location of the tune selected is detected and the player is put in its stand-by condition. In this case, the output terminal of the pickup arm is adapted not to be connected to an audio amplifier circuit until completion of the location of the selected tune. This can automatically be carried out by suitable means which will be described later on.

There has heretofore been proposed, as such detecting means, a method which comprises a light source and a photoelectric converter both attached to the head of the pickup arm on the side of the stylus and is adapted to receive the light reflected from the record zone and the non-record zone to thereby detect the difference in the quantity of light due to the difference in pitch of the grooves, or a method according to which a vibration detector having a resilient contactor is attached to the head of the pickup arm on the side of the stylus and is adapted to move with the stylus of the pickup arm to thereby detect the difference in pitch of the grooves of the record zone and the non-record zones. However, the means of such methods are both attached to the head of the pickup arm, so that the head becomes heavy and complicated in construction. This often exerts an adverse influence upon the vibration ssytem of the pickup arm itself. The aforementioned detecting means 25 of this invention are, however, mounted on the rotary shaft 12 of the pickup arm 7 whose mass exerts a minimum influence upon the stylus pressure or the entire vibration ssytem. Further, the detecting means has a special advantage in that it performs the detection without preventing the pickup arm from rotation by mechanical friction.

In this invention, driving means for the pickup arm and memory means for the detected position can be provided in addition to the detecting means 25. That is, a lever 33, affixed to the lower end of the rotary shaft 12 of the pickup arm 7, has attached thereto a rod-like magnet 21 at one end in a direction perpendicular to the rotary shaft 12, or the lever 33 is made and used as a magnet. Meanwhile, an electromagnet device having a U-shaped core 23 with a coil wound thereon is disposed opposite the magnet 21 in such a manner that the projecting arms of the core 23 hold one end of the magnet 21 therebetween, constituting driving means 24 for driving the pickup arm 7 in a horizontal direction (parallel to the surface of the record). In this case, the both electrodes of the core 23 are located in a horizontal plane including the magnet 21. With such an arrangement, application of a DC current to the coil 22 causes the free end of the rod-like magnet 21 to rotate towards the free end of one arm of the U-shaped core 23, with the result that the pickup arm 7 rotates in one horizontal direction. Upon reversal of the direction of the DC current applied to the coil 22, the rod-like magnet 21 and consequently the pickup arm 7 rotates in a direction opposite to the aforementioned one. Reference numeral 26 indicates a reversing switch, 27 a DC power source driving switch and 28 a DC power source.

Figure 8:
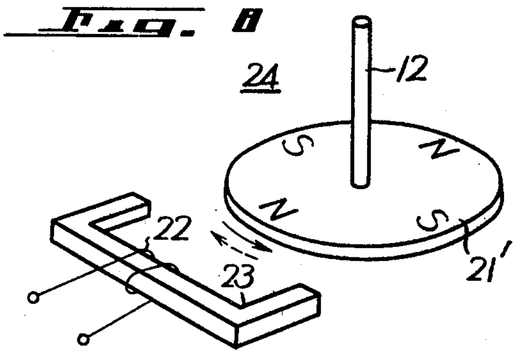
FIGURE 8 is a perspective view schematically illustrating means for driving the pickup arm in a horizontal direction, different from that shown in FIGURE 1.

In FIGURE 8 there is illustrated another example of the electromagnetic driving means 24 for driving the pickup arm 7 in a horizontal direction. As depicted in the figure, a disc-like magnet 21', which is magnetized N and S sequentially in its circumferential direction, is affixed to the rotary shaft 12 in place of the rod-like magnet 21 and an electromagnet 23 similar to the aforementioned one is disposed opposite the magnet 21'. Also in this case, supply of a DC current to the coil 22 enables rotation of the pickup arm 7 in the same manner as in the foregoing.

Figure 9:
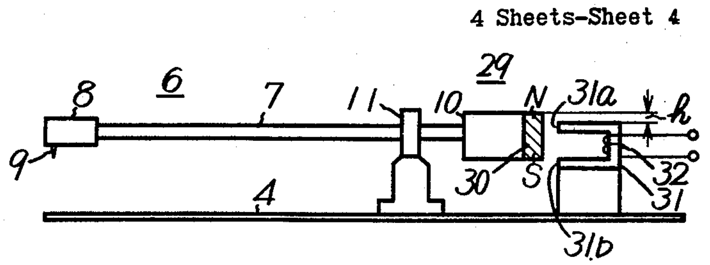
FIGURE 9 is a side view showing means for driving the pickup arm in a vertical direction.

Furthermore, there are provided vertical driving means 29 for lifting up the head of the pickup unit 6 from a pickup arm rest (not shown) or from the surface of the record, namely for moving the pickup arm 7 in a vertical direction. One example of the vertical driving means 29 is illustrated in detail in FIGURES 9 and 10. As depicted in the figures, a magnet or a magnetic member 30 is attached to the pickup arm 7 on the opposite side of the stylus 9 (on the side of the weight balance 10 in the figures) and a core 31 having a U-shaped cross-section is disposed rearwardly of the magnet 30 at such a position that their end faces **31*a* and 31*b* are in slightly-spaced and opposed relation to the magnet 30 having wound thereon a coil 32. In addition, the end faces 31*a* and 31*b* of the core 31 opposite to the magnet 30 are configured to be circular about the bearing member 11 of the pickup arm 7 in such a manner as to cover the horizontal rotation angular range of the pickup arm 7. Further, the magnet 30 and the core 31 are disposed relative to each other so that the upper surface of the magnet 30 and that of the end face 31*a* of the core 31 are offset a distance $h$ when the stylus tip makes contact with the record, namely during playing the record. The distance $h$ is selected to be such that while the head of the pickup arm 7 is being lifted upwards the pickup arm 7 may return to the pickup arm rest or to a predetermined position without touching any other parts during its horizontal movement. With such an arrangement, when a DC current is applied to the coil 32 of the vertical driving means 29, the magnet 30 attached to the pickup arm 7 is attracted to the end faces 31*a* and 31*b* of the core 31 and hence is pulled down a distance $h$, lifting up the head of the pickup arm 7 from the arm rest or the surface of the record. This can be attained over the predetermined rotation angular range of the pickup arm 7, since the end faces or the magnetic poles 31*a* and 31*b* of the vertical driving means are configured circular. In practice, the pickup arm 7 is rotated in a horizontal direction by the aforementioned pickup arm horizontal driving means 24 while the head of the pickup arm 7 being lifted up as described above, and when the pickup arm 7 has rotated to a predetermined position the electric current supply to the coil 32 of the vertical driving means 29 is cut off to bring the stylus 9 down to the surface of the record at a predetermined position or to rest the pickup arm 7** on the arm rest.

A description will be given in connection with the memory means. As illustrated in FIGURE 1, the rotary shaft 12 has affixed directly thereto on the opposite side from the rod-like magnet 21. Where no memory means are provided, only the electromagnet 21' is affixed to the rotary shaft 12 as described previously. Meanwhile, shafts 34 and 35 are provided in parallel with the rotary shaft 12, and a plurality of substantially fan-shaped rotors, in the example shown in FIGURE 1 two fan-shaped rotors **36*a* and 36*b* are mounted on the shaft 34 rotatable thereabout but unmovable in its axial direction while being biased in one direction with respect to the shaft 34. One rotor 36*a* is disposed at the same level as the free end of the aforementioned lever 33. Reference numerals 37*a* and 37*b* designate springs for biasing the rotors 36*a* and 36*b* respectively. Accordingly, the rotor 36*a* is normally held in a condition such that its one edge 39 adjoining the circumferential portion 38 engages the free end of the lever 33, and the rotor 36***a* follows rotation of the pickup arm 7 and consequently the lever 33 and rotates in a direction opposite to that of the rotation thereof.

In opposing relation to the rotors 36*a* and 36*b* rotary arms 40*a* and 40*b* are mounted on the other shaft 35 similarly rotatable thereabout but unmovable in its axial direction and the rotary arms are designed so that their left free ends engage with circumferential portions 38 and 38' of the rotors 36*a* and 36*b* respectively. Opposite the other free ends of the rotary arms 40*a* and 40*b* are disposed electromagnets 43*a* and 43*b* having cores 42*a* and 42*b* with coils 41*a* and 41*b* wound thereon. Rotation of the rotary arms 40*a* and 40*b* due to electric current supply causes their left free ends to constitute braking means for the aforementioned rotors 36*a* and 36*b*. Reference numerals 44*a* and 44*b* identify springs for releasing braking of the rotors 36*a* and 36*b* upon deenergization of the electromagnets 43*a* and 43*b*, which springs are positioned between the other free ends of the rotary arms 40*a* and 40*b* and the fixed parts $f_a$ and $f_b$. Reference numerals 45*a* and 45*b* indicate stoppers for the rotary arms 40*a* and 40*b*. The rotors 36*a* and 36*b* and the rotation stopping means constitute memory means 46*a* and 46*b* for the starting position of play of a record. The following will describe the memory means in detail.

For convenience of description, suppose that a tune to be played from a first record is a second one recorded in the second record zone 2*b* shown in FIGURE 2. For this purpose, the record is placed on the turntable 5 and the pickup arm 7 is manually brought to such a position that the stylus 9 assumes a position as close to the terminating end of the first tune as possible, while the rotor 36*a* is rotated simultaneously. Following this, a current is applied to the electromagnet 43*a* to hold the rotor 36*a* in that position electromagnetically and mechanically. Under such conditions, even if the pickup arm 7 is returned to its initial position on the arm rest, the rotor 36*a* does not ever rotate following the rotation of the pickup arm 7. In this manner, the rotor 36*a* is locked electromagnetically and mechanically. Thereafter, the shafts 34 and 35 are moved in their axial direction and the other rotor 36*b* is placed opposite the lever 33, after which the rotor 36*b* is locked in accordance with a tune to be played from a second record which is carried out in exactly the same manner as in the locking of the rotor 36*a*. That is, if the tune to be played is, for example, a third one recorded in the third record zone 2*c*, the pickup arm 7 is brought to a position such that the stylus 9 assumes a position close to the terminating end of a tune recorded in the second record zone 2*b* ahead of the third one 2*c* and then a current is applied to the electromagnet 43*b* to hold the rotor 36*b* in its final position. Thus, the starting position of play of the second record is memorized by the memory means 46*b*. With the provision of a plurality of memory means the starting position of play of many records can be memorized electromagnetically and mechanically in a similar manner. It is preferred to perform the above-described memorizing operation while the stylus 9 makes contact with the marginal non-record zone or the non-record zone 3*a* or 3*b* immediately before the selected tune recorded in the record zone 2*a*, 2*b* or 2*c*. However, the width of the non-record zones 3*a* and 3*b* is generally extremely narrow, so that, in this invention, during the memorizing operation the stylus 9 is located extremely close to the terminating end of the record zone before that to be played. As a result of this, during playing of the record the stylus 9 is brought to the above-described memorized position or to the terminating end of the tune before the tune to be played. In practice, however, playing is caused to start from the beginning of the tune by the employment of some means.

Figure 12:
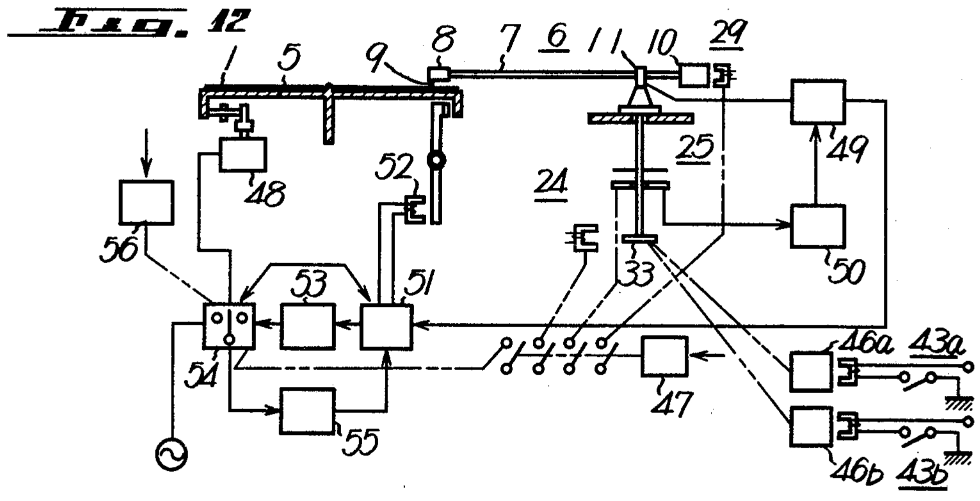
FIGURE 12 is a block diagram for explaining this invention.

Referring now to FIGURE 12, such means will be described in detail. In this case, predetermined starting positions of playing of a plurality of records have previously been memorized by the memory means and the shafts 34 and 35 have been returned to such a position that a first record is to be played, namely the lever 33 engages with the rotor 36*a*.

Prior to playing the records are arranged in an order such that the starting positions of their play have previously been memorized. Then, a first record is placed on the turntable 5 and a preparatory button 47 is pushed. Upon pushing the button 47, a motor 48 starts to rotate the turntable 5, and an electrical current is applied to the horizontal and vertical driving electromagnet means 24 and 29, by which the pickup arm 7 starts to rotate in a vertical and a horizontal direction. The pickup arm 7 continues to rotate until the lever 33 affixed to the rotary shaft 12 of the pickup arm 7 comes into engagement with the rotor 36*a* and then stops at such a position. Under such a condition power supply to the coils 22 and 32 of the vertical and horizontal driving means is cut off and the stylus 9 is thereby brought into contact with the record at the predetermined position (namely at the terminating end of the tune recorded in the first record zone 2*a* of the first record). At this time, only the motor 48 rotates in its forward direction. Further, power supply to the coil 41*a* is cut off simultaneously with the coils 22 and 32, releasing the rotor 36*a* from braking applied thereto. In this case, by selecting the biasing force of the rotor 36*a* or the biasing force of the spring 37*a* to be extremely small, the influence of the rotor 36*a* upon the pickup arm 7 can be almost neglected. In some cases the spring 37*a* can be released primarily. As a result of this, the pickup 6 is ready for producing signals of the terminating portion of the first tune recorded in the first record zone 2*a*, but in this case a switching circuit 49 depicted in FIGURE 12 is held in the off state, so that the signals cannot be taken out. Then, when the stylus 9 is brought to the non-record zone 3*a* the switching circuit 49 is put in the on state through a differentiation circuit 50 by pulses obtained at detecting means 25. When the stylus 9 has reached the groove of the second record zone 2*b*, signals of the groove are applied to a control circuit 51 and the brake is applied to the turntable 5 or to the motor 48, with the result that the rotation of the turntable 5 is automatically stopped with the stylus 9 being in contact with the record. At this time the stlylus 9 assumes a position a little past the starting end of the tune recorded in the second record zone 2*b*. Thus, first signals are applied through a signal delay circuit 53 to a switch reversing circuit 54 to change over its switch and simultaneously the braking means 52 are deenergized to reverse the rotation of the motor 48. Meanwhile, upon changing-over of the switch of the reversing circuit 54 signals are taken out and then are applied to the control circuit 51 through a second signal delay circuit 55, causing the braking means 54 to stop the backward rotation of the turntable 5. The time for the reversal of the rotation of the turntable 5 is selected to be substantially equal to a time from the conduction of the switching circuit 49 to the first application of the braking to the turntable 5. In such a case, the stylus 9 of the pickup 6 comes to rest in contact with the starting end of the tune to be played, namely the tune recorded in the second record zone 2*b*. This completes preparation for playing of the record and puts the record player in its stand-by condition. Therefore, upon pushing of a starting button 57 at a predetermined time playing can be immediately initiated from the predetermined position and the signals from the pickup are taken out.

Upon completion of the playing of the first record, the pickup arm 6 is brought back to the arm rest and the record is removed from the turntable 5. Then, a second record is mounted on the turntable 5. These operations are carried out partly or entirely automatically or manually. Under such conditions, pushing of the preparatory button 47 will lead to bringing the stylus 9 to a predetermined position of the second record to put the record player in its stand-by condition in the same manner as in the foregoing. In this case, however, the shafts 34 and 35 move upwards in their axial direction to engage the second memory means 46*b* with the lever 33. Playing of the following records are carried out in the same manner.

Figures 10, 11:
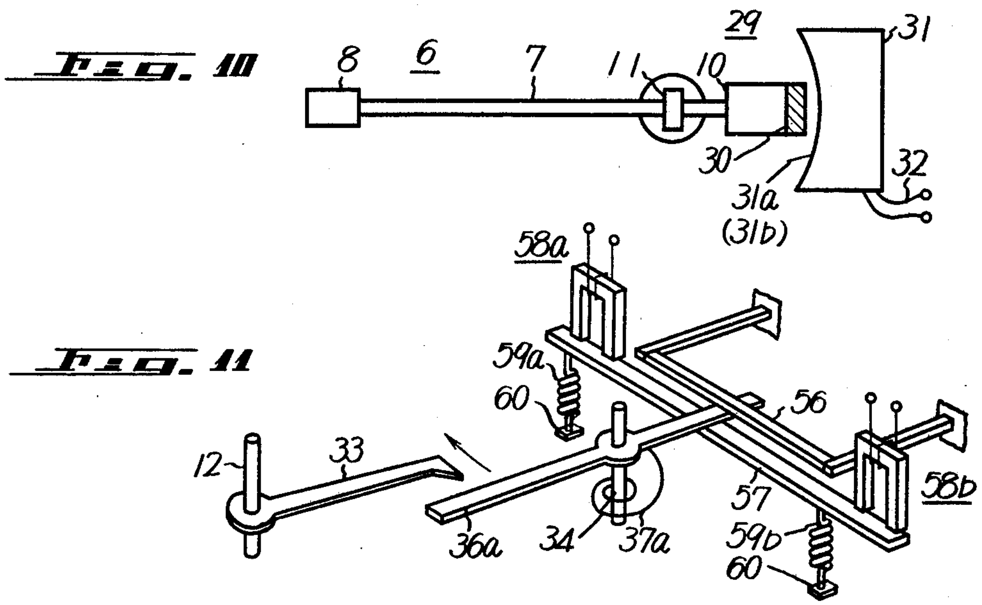
FIGURE 10 is a plan view of the means shown in FIGURE 9.
FIGURE 11 is a perspective view illustrating memory means different from that shown in FIGURE 1.

In FIGURE 11 there is illustrated another modified form of the memory means 46*a* and 46*b*, in which similar components are indicated by the same reference numerals. In this example the rotor 36*a* is arm-shaped and the arm is held at one end between a pair of parallel rods 56 and 57, the rod 56 being fixed. The rotor 36*a* is adapted to be mechanically locked by pulling up the rod 57 with electromagnets 58*a* and 58*b*. Reference numerals 59*a* and 59*b* identify springs for disengaging the rod 57 from the arm 36*a*, and 60 designates a stationary part.

With such an arrangement as described in the foregoing mere previous manual memorization of complicated operations for record playing, which are manually carried out in conventional record players, enables substantially complete automation of the operations following the memorization. This does not need skillful operations and ensures extremely easy and accurate start of record playing from a predetermined position.

Further, the horizontal and vertical driving of the pickup arm 7 is carried out by utilizing electromagnetic attraction and repulsion, so that although the pickup is adapted to be automatically rotated by various means, these means can be made independent of the pickup 6 during playing. Accordingly, it is not likely that during playing the pickup is subject to an adverse influence such as mechanical contact, friction or the like from outside.

It will be apparent that many modifications and variations may be effected without departing from the scope of the novel concepts of this invention.

What I claim is:

1. A record player for playing a record disc having a plurality of concentrically spaced sound zones of which only one is to be played, successive zones being connected by a grove in the space between them such that as the pickup arm tracks the groove, its angular velocity is greater than when it tracks the sound zone comprising, a frame, a turntable rotatably mounted on said frame, a pickup arm rotatably supported on said frame, a pickup cartridge having a stylus mounted on the pickup arm, a shaft affixed to said pickup arm so as to be rotated with said pickup arm and mounted on said frame, angular rotation of said pickup arm, said control signal indicates the stylus being in contact with a space between sound zones by detecting an abrupt increase of angular velocity of said pickup arm, means for memorizing the angular position of said pickup arm preparatory to playback, means for actuating said memorizing means when said angular position corresponds to said stylus being in contact with a space just prior to playing the desired sound zone, and means responsive to the memorizing means during playback for bringing said pickup arm to said angular position when it is desired to play said desired sound track.

2. A record player as claimed in claim 1 wherein electromagnetic driving means are provided for driving said pickup arm in a horizontal direction, said electromagnetic driving means consisting of a magnet attached to one end of said rotary shaft and an electromagnet fixed to a stationary part of said frame.

3. A record player as claimed in claim 1 wherein said pickup arm having two ends, said stylus being mounted near one end, and electromagnetic driving means are provided for driving said pickup arm vertically about the pivot thereof, said electromagnetic driving means consisting of a magnet attached to the end of said pickup arm on the end opposite from the stylus and an electromagnet fixed to the frame in opposing relation to said magnet.

4. A record player according to claim 1 wherein said means for obtaining a control signal consists of a rotary magnetic plate attached to said shaft, a supporting plate mounted in a spaced relation from said magnetic plate, three coils mounted on said supporting plate, and said magnetic plate and said three coils arranged and connected to form a differential transformer.

5. A record player according to claim 1 wherein said means for obtaining a control signal includes a photoelectric detecting device.

6. A record player according to claim 5 wherein said photoelectric detecting device includes a rotary plate attached to the shaft of said pickup arm, said rotary plate formed with a generally crescent-shaped aperture which gradually changes in width, the stationary plate mounted adjacent said rotary plate and formed with a slit which crosses said aperture when said rotary plate turns, a light source, a photoelectric detector, said light source and said photoelectric detector mounted on opposite sides of said rotary and stationary plates so that light from said light source is received by said photoelectric detector through said tapered crescent-shaped aperture and slit.

7. A record player in accordance with claim 1 wherein first and second electromagnetic driving means are provided, said first electromagnetic driving means rotate said pickup arm horizontally to bring said pickup arm to said predetermined position determined by said memorizing means, and said second electromagnetic driving means keeps said pickup arm separated from the surface of said record disc while said first electromagnetic driving means is rotating said pickup arm.

8. A record player according to claim 1 wherein the means for obtaining a control signal comprises a switching circuit which receives a signal from said pickup cartridge, said switching circuit controlled by said control signal, a braking means for the turntable, a control circuit for controlling said braking means by the signal from said pickup cartridge, first signal delay circuit means for delaying the signal from said control circuit, a circuit for reversing the direction of the rotation of the turntable by the signal from said first signal delay circuit, and second signal delay circuit means supplied with the signal from the reversing circuit for producing the delayed signal for controlling said control circuit.

9. A record player according to claim 1 wherein the memorizing means comprises rotary means the rotational position of which indicates the desired angular position, pivoted lever means mounted on said shaft and which contacts the rotary means to detect the desired angular position, and means for holding said rotary means in a position corresponding to said desired angular position.

10. A record player according to claim 9 wherein said rotary means comprises a sector plate pivoted on a shaft and having a periphery, biasing means for rotating said sector plate in one direction, and said holding means comprising a pivoted lever with one end which engages the periphery of said sector plate, and means for exerting force on the other end of said pivoted lever to pivot said one end of said lever into contact with said periphery and thus to hold said rotary sector at a position corresponding to said predetermined position against said biasing means.

11. A record player in accordance with claim 9 wherein said rotary means comprises a rotary rod pivoted on a shaft, biasing means provided for rotating said rotary rod in one direction, one end of said rotary rod engaged with said lever means and said holding means includes a stationary rod, a magnetic movable rod opposite to said stationary rod, the other end of said rotary rod extended between said stationary rod and said magnetic movable rod, electromagnetic means for moving said magnetic movable rod toward said rotary rod so as to hold said rotary rod between said stationary rod and said magnetic movable rod, and spring means for separating said magnetic movable rod from said rotary rod when said electromagnetic means are deenergized.

References Cited

UNITED STATES PATENTS

| | | | |
|---|---|---|---|
| 3,411,791 | 11/1968 | Dennis | 274—10 |
| 1,291,985 | 1/1919 | Manson | 274—14 |
| 1,475,583 | 11/1923 | Hoxie | 88—61 |
| 2,307,259 | 1/1943 | Fling | 274—14 |
| 2,325,708 | 8/1943 | Runge | 274—14 |
| 2,912,767 | 11/1959 | Mittelmann | 33—206.5 |
| 2,952,464 | 9/1960 | Stimler | 274—15 |
| 2,989,642 | 6/1961 | Syel | 340—282 |
| 3,206,151 | 9/1965 | Lillestrand | 33—206.5 XR |
| 3,291,019 | 12/1966 | Eagle. | |
| 3,292,935 | 12/1966 | Cooper. | |

LEONARD FORMAN, Primary Examiner

STEVEN L. STEPHAN, Assistant Examiner

U.S. Cl. X.R.

250—231; 274—1

UNITED STATES PATENT OFFICE
CERTIFICATE OF CORRECTION

Patent No. 3,503,615 Dated March 31, 1970

Inventor(s) HITOSHI MATSUDA

It is certified that error appears in the above-identified patent and that said Letters Patent are hereby corrected as shown below:

Column 2, line 71, "turnable" should read --turntable--.

Column 5, line 42, "ssytem" should read --system--.

Column 9, line 53, after "frame" insert --means for obtaining a control signal corresponding to--.

Signed and sealed this 3rd day of August 1971.

(SEAL)
Attest:

EDWARD M.FLETCHER.JR.
Attesting Officer

WILLIAM E. SCHUYLER, JR.
Commissioner of Patents